(12) United States Patent
Mishra et al.

(10) Patent No.: US 8,992,818 B2
(45) Date of Patent: Mar. 31, 2015

(54) SEAMLESS INTERMEDIATE TRANSFER MEMBER PROCESS

(75) Inventors: Satchidanand Mishra, Webster, NY (US); Edward A. Domm, Hilton, NY (US); Jin Wu, Pittsford, NY (US); Geoffrey M. T. Foley, Fairport, NY (US); Edward F. Grabowski, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 2 days.

(21) Appl. No.: 12/835,104

(22) Filed: Jul. 13, 2010

(65) Prior Publication Data

US 2012/0015153 A1    Jan. 19, 2012

(51) Int. Cl.
*B29C 41/26* (2006.01)
*G03G 15/16* (2006.01)
*B29C 35/08* (2006.01)
*B29L 31/32* (2006.01)

(52) U.S. Cl.
CPC ............ *G03G 15/161* (2013.01); *G03G 15/162* (2013.01); *B29C 2035/0827* (2013.01); *B29L 2031/324* (2013.01); *G03G 2215/1623* (2013.01); *Y10S 977/742* (2013.01)
USPC ............ 264/496; 264/311; 264/309; 977/742

(58) Field of Classification Search
None
See application file for complete search history.

(56) References Cited

U.S. PATENT DOCUMENTS

| | | | |
|---|---|---|---|
| 4,711,833 A | 12/1987 | McAneney et al. | |
| 5,021,036 A | 6/1991 | Tanaka et al. | |
| 5,128,091 A * | 7/1992 | Agur et al. | 264/512 |
| 5,162,183 A | 11/1992 | Lindblad et al. | |
| 5,187,039 A | 2/1993 | Meyer | |
| 5,300,391 A * | 4/1994 | Fabian et al. | 430/127 |
| 5,389,412 A | 2/1995 | Tanaka et al. | |
| 5,714,248 A * | 2/1998 | Lewis | 428/325 |
| 6,139,784 A | 10/2000 | Oshima et al. | |
| 6,185,398 B1 | 2/2001 | Tanaka et al. | |
| 6,500,367 B2 | 12/2002 | Naus et al. | |
| 6,541,172 B2 * | 4/2003 | Nagasaka et al. | 430/59.5 |
| 7,008,589 B1 * | 3/2006 | Poulakis | 264/470 |
| 7,524,597 B2 * | 4/2009 | Mishra et al. | 430/58.8 |
| 7,645,547 B2 | 1/2010 | Okuda et al. | |
| 2003/0008116 A1 | 1/2003 | Williams et al. | |
| 2004/0051211 A1 | 3/2004 | Mastro et al. | |
| 2004/0051221 A1 | 3/2004 | Sunadome | |
| 2004/0086305 A1 * | 5/2004 | Stulc et al. | 399/308 |
| 2006/0204743 A1 | 9/2006 | Beck et al. | |
| 2007/0116958 A1 | 5/2007 | Suzuki et al. | |

(Continued)

FOREIGN PATENT DOCUMENTS

WO    0064685 A1    11/2000

OTHER PUBLICATIONS

U.S. Appl. No. 12/917,724, Notice of Allowance and Fees Due dated Aug. 21, 2012.

(Continued)

*Primary Examiner* — Benjamin Schiffman
(74) *Attorney, Agent, or Firm* — Hoffman Warnick LLC

(57) ABSTRACT

Described herein is a method of forming a seamless transfer member suitable for use with an image forming system. The method includes spray coating a UV curable polymer and conductive particles onto an inner surface of a rotating cylindrical mandrel. The UV curable polymer is cured with ultra violet energy. The cured UV polymer is removed from the cylindrical rotatable mandrel.

12 Claims, 2 Drawing Sheets

(56) References Cited

U.S. PATENT DOCUMENTS

| | | | |
|---|---|---|---|
| 2007/0128365 A1 | 6/2007 | Koch et al. | |
| 2008/0152895 A1* | 6/2008 | Law | 428/323 |
| 2009/0022902 A1 | 1/2009 | Johnson et al. | |
| 2011/0024024 A1* | 2/2011 | Pietrantoni et al. | 156/137 |
| 2011/0123732 A1 | 5/2011 | Foley et al. | |
| 2011/0233475 A1 | 9/2011 | Foley et al. | |
| 2012/0009352 A1* | 1/2012 | Foley et al. | 427/512 |
| 2012/0104661 A1* | 5/2012 | Wu | 264/496 |
| 2012/0146265 A1* | 6/2012 | Wu | 264/463 |

OTHER PUBLICATIONS

U.S. Appl. No. 12/917,724, filed Nov. 2, 2010, Office Action dated Apr. 27, 2012.

German Patent Application No. 10 2011 085 295.6, Search Report dated Dec. 23, 2013, 5 pages.

U.S. Appl. No. 12/917,730, Office Action dated May 29, 2013.

U.S. Appl. No. 12/917,730, Office Action dated Oct. 29, 2013, XRX-0018, 12 pages.

* cited by examiner

SEAMLESS INTERMEDIATE TRANSFER MEMBER PROCESS

BACKGROUND

1. Field of Use

This disclosure is directed to an image forming apparatus and an intermediate transfer member.

2. Background

In the printing industry many of the current flexible photoreceptor belts (P/R) or intermediate transfer belts are obtained by shearing a piece of web material coated with several layers of an organic material with desired electrical and mechanical properties and welding the two ends together in a variety of ways such as electro-welding. The seam present in the intermediate transfer belts creates certain issues. One issue is the need to avoid the seam coming into a printed area. Seam detection and managing the duty cycles for various paper lengths is a complicated software and technology challenge. Due to their expense, seamless belts have been used predominantly for large machines.

Seamless P/R and intermediate transfer belts, especially for smaller low volume printers, would be useful. For color machine architecture, a seamless intermediate transfer belt would reduce the size of a full color machine.

SUMMARY

Described herein is a method of forming a seamless transfer member suitable for use with an image forming system. The method includes spray coating a mixture of a UV curable polymer and conductive particles onto an inner surface of a rotating cylindrical mandrel. The UV curable polymer is cured with ultra violet energy and is removed from the rotatable cylindrical mandrel.

According to various embodiments, the present teachings also include an intermediate transfer belt (ITB). The ITB can include one or more coating layers stacked together with each coating layer including a UV cured polymer. The ITB can have a surface resistivity ranging from about $10^8$ ohms/sq to about $10^{13}$ ohms/sq, and a thickness ranging from about 30 microns to about 500 microns.

Described herein is a method of forming a seamless transfer member suitable for use with an image forming system. The method includes spray coating a composition comprising an ultra violet (UV) curable polymer, a photoinitiator and conductive particles onto an inner surface of a rotating cylindrical mandrel wherein the inner surface of the mandrel has a finish of from about 0.01 microns to about 1.0 microns. The composition is cured with ultra violet energy and the cured composition is removed from the cylindrical rotatable mold.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

It should be noted that some details of the figures have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Figure 1:
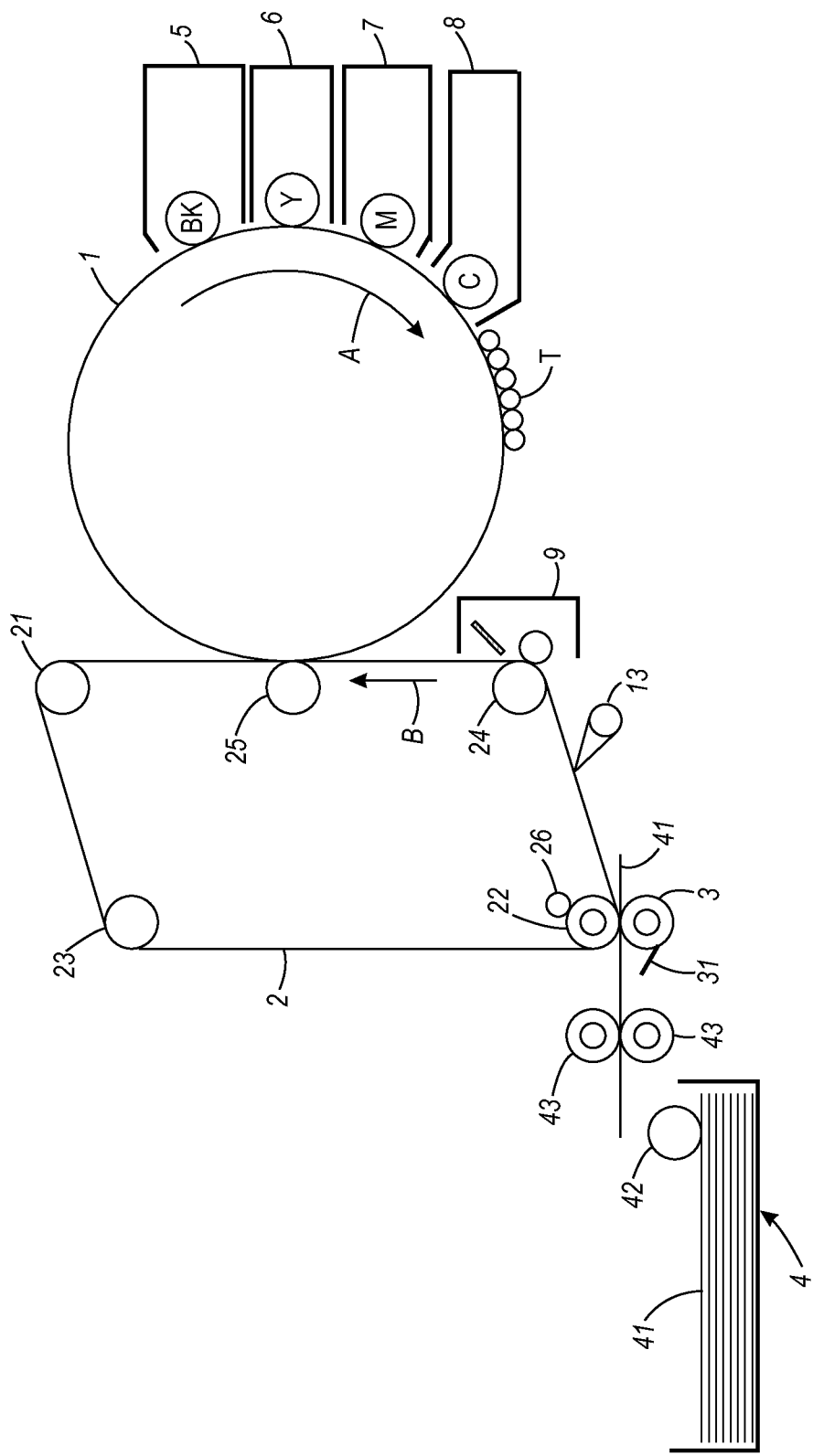
FIG. 1 is a schematic illustration of an image apparatus.

Referring to FIG. 1, an image forming apparatus includes an intermediate transfer member as described in more detail below. The image forming apparatus is an intermediate transfer system comprising a first transfer unit for transferring the toner image formed on the image carrier onto the intermediate transfer member by primary transfer, and a second transfer unit for transferring the toner image transferred on the intermediate transfer member onto the transfer material by secondary transfer. Also, in the image forming apparatus, the intermediate transfer member may be provided as a transfer-conveying member in the transfer region for transferring the toner image onto the transfer material. Having an intermediate transfer belt that transfers images of high quality and remains stable for a long period is required.

The image forming apparatus described herein is not particularly limited as far as it is an image forming apparatus of intermediate transfer type. Examples include an ordinary monochromatic image forming apparatus accommodating only a monochromatic color in the developing device, a color image forming apparatus for repeating primary transfer of the toner image carried on the image carrier sequentially on the intermediate transfer member, and a tandem color image forming apparatus having plural image carriers with developing units of each color disposed in series on the intermediate transfer member. More specifically, the image forming apparatus may arbitrarily comprise an image carrier, a charging unit for uniformly charging the surface of the image carrier, an exposure unit for exposing the surface of the intermediate transfer belt and forming an electrostatic latent image, a developing unit for developing the latent image formed on the surface of the image carrier by using a developing solution and forming a toner image, a fixing unit for fixing the toner unit on the transfer material, a cleaning unit for removing toner and foreign matter sticking to the image carrier, a destaticizing unit for removing the electrostatic latent image left over on the surface of the image carrier, and other known methods as required.

As the image carrier, a known one may be used. As the image carrier's photosensitive layer, an organic system, amorphous silicon, or other known material may be used. In the case of an image carrier of cylindrical type, the image carrier is obtained by a known method of molding aluminum or aluminum alloy by extrusion and processing the surface. A belt form image carrier may also be used.

The charging unit is not particularly limited and known chargers may be used, such as a contact type charger using conductive or semiconductive roller, brush, film and rubber blade, scorotron charger or corotron charge making use of corona discharge, and others. Above all, the contact type charging unit is preferred from the viewpoint of excellent charge compensation capability. The charging unit usually applies DC current to the electrophotographic photosensitive material, but AC current may be further superimposed.

The exposure unit is not particularly limited for example, an optical system device, which exposes a desired image on the surface of the electrophotographic photosensitive material by using a light source such as semiconductor laser beam, LED beam, liquid crystal shutter beam or the like, or through a polygonal mirror from such light source, may be used.

The developing unit may be properly selected depending on the purpose, and, for example, a known developing unit for developing by using one-pack type developing solution or two-pack type developing solution, with or without contact, using brush and roller may be used.

The first transfer unit includes known transfer chargers such as a contact type transfer charger using member, roller, film and rubber blade, and scorotron transfer charger or corotron transfer charger making use of corona discharge. Above all, the contact type transfer charger provides excellent transfer charge compensation capability. Aside from the transfer charger, a peeling type charger may be also used.

The second transfer unit may be the same as the first transfer unit, such as a contact type transfer charger using transfer roller and others, scorotron transfer charger, and corotron transfer charger. By pressing firmly using the transfer roller of the contact type transfer charger, the image transfer stage can be maintained. Further, by pressing the transfer roller or the contact type transfer charger at the position of the roller for guiding the intermediate transfer belt, the action of moving the toner image from the intermediate transfer belt to the transfer material may be performed.

As the photo destaticizing unit, for example, a tungsten lamp or LED may be used, and the light quality used in the photo destaticizing process may include white light of tungsten lamp and red light of LED. As the irradiation light intensity in the photo destaticizing process, usually the output is set to be about several times to 30 times of the quantity of light showing the half exposure sensitivity of the electrophotographic photosensitive material.

The fixing unit is not particularly limited, and any known fixing unit may be used, such as heat roller fixing unit and oven fixing unit.

The cleaning unit is not particularly limited, and any known cleaning device may be used.

A color image forming apparatus for repeating primary transfer is shown schematically in FIG. 1. The image forming apparatus shown in FIG. 1 includes a photosensitive drum 1 as image carrier, an intermediate transfer member 2, shown as an intermediate transfer belt, a bias roller 3 as transfer electrode, a tray 4 for feeding paper as transfer material, a developing device 5 by BK (black) toner, a developing device 6 by Y (yellow) toner, a developing device 7 by M (magenta) toner, a developing device 8 by C (cyan) toner, a member cleaner 9, a peeling pawl 13, rollers 21, 23 and 24, a backup roller 22, a conductive roller 25, an electrode roller 26, a cleaning blade 31, a block of paper 41, a pickup roller 42, and feed rollers 43.

In the image forming apparatus shown in FIG. 1, the photosensitive drum 1 rotates in the direction of arrow A, and the surface of the charging device (not shown) is uniformly charged. On the charged photosensitive drum 1, an electrostatic latent image of a first color (for example, BK) is formed by an image writing device such as a laser writing device. This electrostatic latent image is developed by toner by the developing device 5, and a visible toner image T is formed. The toner image T is brought to the primary transfer unit comprising the conductive roller 25 by rotation of the photosensitive drum 1, and an electric field of reverse polarity is applied to the toner image T from the conductive roller 25. The toner image T is electrostatically adsorbed on the intermediate transfer belt 2, and the primary transfer is executed by rotation of the intermediate transfer belt 2 in the direction of arrow B.

Similarly, a toner image of a second color, a toner image of a third color, and a toner image of a fourth color are sequentially formed and overlaid on the transfer belt 2, and a multi-layer toner image is formed.

The multi-layer toner image transferred on the transfer belt 2 is brought to the secondary transfer unit comprising the bias roller 3 by rotation of the transfer belt 2. The secondary transfer unit comprises the bias roller 3 disposed at the surface side carrying the toner image of the transfer belt 2, backup roller 22 disposed to face the bias roller 3 from the back side of the transfer belt 2, and electrode roller 26 rotating in tight contact with the backup roller 22.

The paper 41 is taken out one by one from the paper block accommodated in the paper tray 4 by means of the pickup roller 42, and is fed into the space between the transfer belt 2 and bias roller 3 of the secondary transfer unit by means of the feed roller 43 at a specified timing. The fed paper 41 is conveyed under pressure between the bias roller 3 and backup roller 22, and the toner image carried on the transfer belt 2 is transferred thereon by rotation of the transfer member 2.

The paper 41 on which the toner image is transferred is peeled off from the transfer member 2 by operating the peeling pawl 13 at the retreat position until the end of primary transfer of the final toner image, and conveyed to the fixing device (not shown). The toner image is fixed by pressing and heating, and a permanent image is formed. After transfer of the multi-layer toner image onto the paper 41, the transfer belt 2 is cleaned by the cleaner 9 disposed at the downstream side of the secondary transfer unit to remove the residual toner, and is ready for next transfer. The bias roller 3 is provided so that the cleaning blade 31, made of polyurethane or the like, may be always in contact, and toner particles, paper dust, and other foreign matter sticking by transfer are removed.

In the case of transfer of a monochromatic image, the toner image T after primary transfer is immediately sent to the secondary transfer process, and is conveyed to the fixing device. But in the case of transfer of a multi-color image by combination of plural colors, the rotation of the intermediate transfer belt 2 and photosensitive drum 1 is synchronized so that the toner images of plural colors may coincide exactly in the primary transfer unit, and deviation of toner images of colors is prevented. In the secondary transfer unit, by applying a voltage of the same polarity (transfer voltage) as the polarity of the toner to the electrode roller 26 tightly contacting with the backup roller 22 disposed oppositely through the bias roller 3 and intermediate transfer belt 2, the toner image is transferred onto the paper 41 by electrostatic repulsion. Thus, the image is formed.

The intermediate transfer belt 2 described herein is a seamless belt.

The process for the manufacture of polymeric seamless intermediate transfer belt (ITB) for xerographic applications is described herein. The ITB is obtained by spraying a layer of a UV curable polymer or successive layers of UV curable polymers inside a cylindrical mandrel. The UV polymer contains conductive particles. The UV curable polymer layer is solidified by UV radiation to form a uniform solid film. If desired, subsequent layers of UV curable polymers can be applied to the first layer to increase thickness and modify properties of the ITB.

The process includes generating at least one thin substantially uniform fluid coating on the interior of a cylindrical mandrel, solidifying the fluid coating to form a uniform solid film, and then spraying the next layer. The seamless belt has a smooth outer surface whose finish is determined by the finish on the inner surface of the hollow mandrel which is highly polished. The belt can be of any desired length, constrained only by the diameter of the mandrel. The axial dimension of the cylindrical mandrel dictates the width of the fabricated belt. That axial dimension can be configured to be multiple belt widths in size such that the fabricated belt may be sliced into multiple belts after fabrication. Uniform coating is obtained by rotating the mandrel about its axis while the spray gun traverses the interior of the mandrel in an axial direction. By this means, it is possible to fabricate a belt with varying composition and electrical properties by depositing successive layers of different materials with each traverse of the spray gun.

Separation of the belt after coating and drying can be achieved by first depositing a release agent inside the mandrel or by incorporating a release agent in the coating solution itself. Another way of achieving the same goal is to coat a permanent solid layer such as Teflon inside the mandrel surface. Another means to facilitate removal of the dried film from the inside of the mandrel is to take advantage of the differential thermal expansion of the mandrel and the dried film. The belt is solidified through UV curing.

Prior methods of manufacturing seamless ITBs required drying processes that were slower than UV curing. In U.S. Pat. Nos. 6,139,784 and 5,389,412 manufacturing processes for polyimide seamless belts require extrusion coating of a liquid thermosetting polyimide solution onto an inner surface of a centrifugal mold. The solution is heated to remove the solvent and thermoset the polyimide. Such a process requires the coating operation and drying process to be done successively. Such in-situ drying by heating interferes with a spray coating operation because the heat gun tends to raise the temperature of the chamber inside the mandrel.

In U.S. Pat. No. 6,500,367, a method of manufacturing a seamless ITB is described in which multiple layers of liquid polymer are applied to a rotating mold and cured at an elevated temperature. Again, by requiring heating to cure the layer, spray coating cannot be used.

Figure 2:
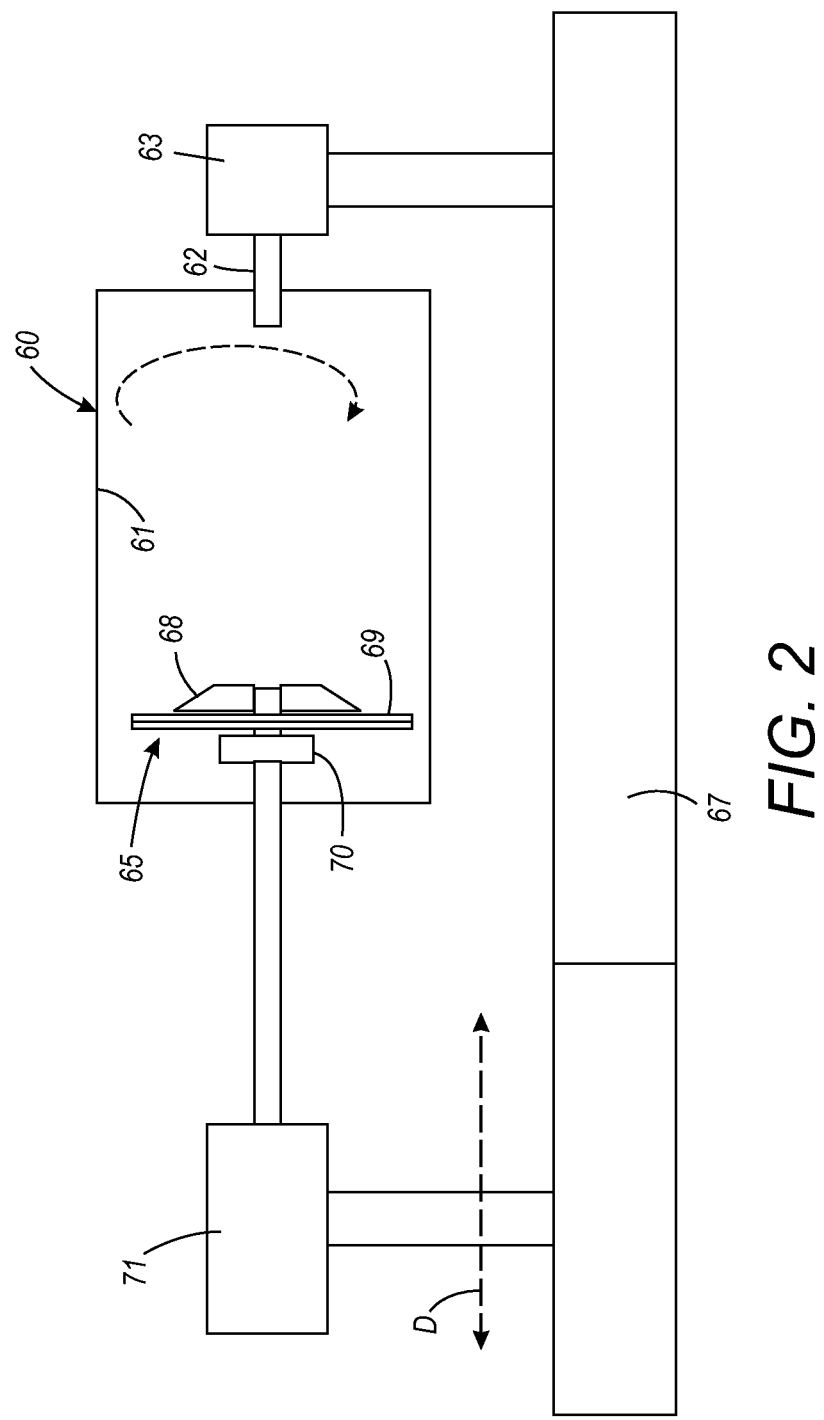
FIG. 2 is a schematic representation of an apparatus suitable for manufacturing a seamless intermediate transfer member.

FIG. 2 shows a schematic diagram of a set up utilized for fabricating a seamless belt with in-situ UV curing. A cylindrical mandrel 60 whose inner surface 61 has been polished to a surface roughness better than 1 micron peak to peak, is mounted on a shaft 62, which can be rotated by a motor 63 as shown by directional arrow C. The coating and curing assembly 65 can traverse parallel to the axis of the mandrel 60, as shown by directional arrow D, on an automated translation stage 67. The coating and curing assembly 65 includes a spray nozzle 68, light shield 69 and UV curing lamp 70. Both the spray nozzle 68 and curing lamp 70 traverse horizontally parallel to the axis of the mandrel 60. UV curable polymer is provided to the spray nozzle 68 through fluid reservoir 71.

A typical spray nozzle used herein has a central fluid nozzle surrounded closely by an annular concentric air nozzle. Fluid is forced out through the nozzle by pressurizing the container. Other means of ejecting fluid from the nozzle such as by creation of a vacuum in a concentric nozzle are well known. The nozzle configuration and pressure parameters are used to shape the spray pattern, which can be circular or elliptical. The mandrel is rotated about its axis to obtain an optimum uniform coating and the spray gun and/or mandrel traverse in a direction D parallel to the drum axis. The process parameters controlling the coating process are interdependent and include propellant gas pressure, solution flow rate, nozzle to inner surface mandrel separation, nozzle traverse speed, and mandrel rotation rate. Optimization is determined by the finish of the mandrel inner surface.

The finish of the outside of the belt fabricated as described above is determined by the inside finish of the mandrel. With diamond lathing and polishing a very smooth surface of the mandrel can be obtained. The roughness of the inside finish of the mandrel ($R_a$) is from about 0.01 microns to about 1 micron, or from about 0.03 microns to about 0.7 microns, or from about 0.05 microns to about 0.5 microns.

A UV curing lamp 70 is mounted behind the spray nozzle 68 preferably in the form of annular rings for uniform illumination and curing. In order to prevent any light leaking in front of the spray nozzle 68 and interfering in the smooth coating, a light shield 69 in the form of a concentric disc is mounted between the spray nozzle 68 and UV lamp 70. The UV curing process is very fast and the layer sprayed is cured quickly as it passes beyond the light shield 69 while the spray nozzle 68 traverses forward. Although any circumferential flow of wet layer is minimized by the centrifugal forces of the rotating mandrel, quick curing prevents any residual sagging in the wet layer. Thus under the best circumstances a belt could be formed in just one single pass. However, multiple passes can be implemented to obtain the proper characteristics of the intermediate transfer belt. The rotating speed is not critical, but can be selected from a broad range, such as from about 100 rpm to about 1,500 rpm, or from about 200 rpm to about 1200, or from about 300 rpm to about 800 rpm.

The combination of UV curing with high spraying speeds increases the manufacture rate, thus increasing the productivity immensely.

The liquid coating composition can include one or more UV curable polymers including, but not limited to, monomeric acrylates, oligomeric acrylates and/or combinations thereof.

In embodiments, monomeric acrylates can function as co-reactants and/or diluents in the composition to adjust system viscosity. The monomeric acrylates can include, for example, trimethylolpropane triacrylates, hexandiol diacrylates, tripropyleneglycol diacrylates, dipropyleneglycol diacrylates, and the like and mixtures thereof.

In embodiments, oligomeric acrylates can be viscous liquid polymers with the molecular weight ranging from several hundreds to several thousands or higher. The oligomeric acrylates can include, for example, urethane acrylates, polyester acrylates, epoxy acrylates, polyether acrylates, and olefin acrylates such as polybutadiene acrylates, and the like and mixtures thereof.

The liquid coating composition can also include photoinitiators, such as, for example, a photoinitiator for a surface curing of the UV curable polymer, a photoinitiator for a bulk curing through the UV curable polymer, and combinations thereof. In an exemplary embodiment, combined photoinitiators can be used to initiate the curing process. Examples of the photoinitiators can include, but are not limited to, acyl phosphines, α-hydroxyketones, benzyl ketals, α-aminoketones, and mixtures thereof.

In embodiments, the photoinitiators can be in a form of, for example, crystalline powders and/or a liquid. The photoinitiators can be present in an amount sufficient to initiate the curing process of the UV curable polymer(s). For example, the photoinitiators can be present in an amount ranging from about 0.5% to about 10%, or from about 1% to about 7%, or from about 2% to about 5% by weight of the UV curable polymer(s).

In embodiments, the liquid coating composition can be heterogeneous and can include UV curable polymer(s) and conductive fillers dispersed in the composition. The coating layer formed on the inside of the mandrel from the heterogeneous coating composition can be a heterogeneous layer, for example a heterogeneous ITB, including conductive fillers dispersed in UV cured polymer resins. The conductive fillers can be conductive and/or semi-conductive.

The conductive fillers can include, but are not limited to, carbon blacks such as contactive furnace carbon blacks and acetylene blacks, carbon nanotubes, fullerenes (e.g., $C_{60}$ and $C_{70}$), polyanilines, stannic oxides, indium oxides, tin oxide, titanium oxide, antimony tin oxide, indium tin oxide, zinc oxide, potassium titanates and/or other types of conductive and semi-conductive powders.

In embodiments, the heterogeneous coating composition can be prepared by ball milling the conductive fillers in a liquid UV curable polymer, and then adding corresponding photoinitiators into the milled dispersion. The final heterogeneous ITB coating layer can include conductive fillers ranging from about 0.1% to about 50%, or from about 1% to about 30%, or ranging from about 3% to about 20% by weight of the total heterogeneous ITB coating layer.

Examples of conductive fillers dispersed in the UV curable polymer include carbon blacks such as carbon black, graphite, acetylene black, fluorinated carbon black, and the like; metal oxides and doped metal oxides, such as tin oxide, antimony dioxide, antimony-doped tin oxide, titanium dioxide, indium oxide, zinc oxide, indium oxide, indium-doped tin trioxide, and the like; and mixtures thereof, Certain polymers such as polyanilines, polythiophenes, polyacetylene, poly(p-phenylene vinylene), poly(p-phenylene sulfide), pyrroles, polyindole, polypyrene, polycarbazole, polyazulene, polyazepine, poly(fluorine), polynaphthalene and mixture thereof can be used as conductive fillers. The conductive filler may be present in an amount of from about 0.1 to about 50 and or from about 3 to about 40, or from about 5 to about 20 parts by weight of total solids of the intermediate transfer belt. These ranges apply for either the single layer or multi-layer applications.

Carbon black surface groups can be formed by oxidation with an acid or with ozone, and where there is absorbed or chemisorbed oxygen groups from, for example, carboxylates, phenols, and the like. The carbon surface is essentially inert to most organic reaction chemistry except primarily for oxidative processes and free radical reactions.

The conductivity of carbon black is primarily dependent on surface area and its structure. Generally, the higher the surface area and the higher the structure, the more conductive the carbon black. Surface area is measured by the B.E.T. nitrogen surface area per unit weight of carbon black, and is the measurement of the primary particle size. The surface area of the carbon black described herein is from about 460 m$^2$/g to about 35 m$^2$/g. Structure is a complex property that refers to the morphology of the primary aggregates of carbon black. It is a measure of both the number of primary particles comprising primary aggregates, and the manner in which they are "fused" together. High structure carbon blacks are characterized by aggregates comprised of many primary particles with considerable "branching" and "chaining", while low structure carbon blacks are characterized by compact aggregates comprised of fewer primary particles. Structure is measured by dibutyl phthalate (DBP) absorption by the voids within carbon blacks. The higher the structure, the more the voids, and the higher the DBP absorption.

Examples of carbon blacks selected as the conductive component for the ITM include VULCAN® carbon blacks, REGAL® carbon blacks, MONARCH® carbon blacks and BLACK PEARLS® carbon blacks available from Cabot Corporation. Specific examples of conductive carbon blacks are BLACK PEARLS® 1000 (B.E.T. surface area=343 m$^2$/g, DBP absorption=1.05 ml/g), BLACK PEARLS® 880 (B.E.T. surface area=240 m$^2$/g, DBP absorption=1.06 ml/g), BLACK PEARLS® 800 (B.E.T. surface area=230 m$^2$/g, DBP absorption=0.68 ml/g), BLACK PEARLS® L (B.E.T. surface area=138 m$^2$/g, DBP absorption=0.61 ml/g), BLACK PEARLS® 570 (B.E.T. surface area=110 m$^2$/g, DBP absorption=1.14 ml/g), BLACK PEARLS® 170 (B.E.T. surface area=35 m$^2$/g, DBP absorption=1.22 ml/g), VULCAN® XC72 (B.E.T. surface area=254 m$^2$/g, DBP absorption=1.76 ml/g), VULCAN® XC72R (fluffy form of VULCAN® XC72), VULCAN® XC605, VULCAN® XC305, REGAL® 660 (B.E.T. surface area=112 m$^2$/g, DBP absorption=0.59 ml/g), REGAL® 400 (B.E.T. surface area=96 m$^2$/g, DBP absorption=0.69 ml/g), REGAL® 330 (B.E.T. surface area=94 m$^2$/g, DBP absorption=0.71 ml/g), MONARCH® 880 (B.E.T. surface area=220 m$^2$/g, DBP absorption=1.05 ml/g, primary particle diameter=16 nanometers), and MONARCH® 1000 (B.E.T. surface area=343 m$^2$/g, DBP absorption=1.05 ml/g, primary particle diameter=16 nanometers); Channel carbon blacks available from Evonik-Degussa; Special Black 4 (B.E.T. surface area=180 m$^2$/g, DBP absorption=1.8 ml/g, primary particle diameter=25 nanometers), Special Black 5 (B.E.T. surface area=240 m$^2$/g, DBP absorption=1.41 ml/g, primary particle diameter=20 nanometers), Color Black FW1 (B.E.T. surface area=320 m$^2$/g, DBP absorption=2.89 ml/g, primary particle diameter=13 nanometers), Color Black FW2 (B.E.T. surface area=460 m$^2$/g, DBP absorption=4.82 ml/g, primary particle diameter=13 nanometers), and Color Black FW200 (B.E.T. surface area=460 m$^2$/g, DBP absorption=4.6 ml/g, primary particle diameter=13 nanometers).

Further examples of conductive fillers include doped metal oxides. Doped metal oxides include antimony doped tin oxide, aluminum doped zinc oxide, antimony doped titanium dioxide, similar doped metal oxides, and mixtures thereof.

Suitable antimony doped tin oxides include those antimony doped tin oxides coated on an inert core particle (e.g., ZELEC®ECP-S, M and T) and those antimony doped tin oxides without a core particle (e.g., ZELEC®ECP-3005-XC and ZELEC®ECP-3010-XC, ZELEC® is a trademark of DuPont Chemicals Jackson Laboratories, Deepwater, N.J.). The core particle may be mica, TiO$_2$ or acicular particles having a hollow or a solid core.

Examples of the metal oxide core include tin oxide, antimony-doped tin oxide, indium oxide, indium-doped tin oxide, zinc oxide, titanium oxide, etc. In an embodiment, the electrically conductive metal oxide core is antimony doped tin oxide. Suitable antimony doped tin oxide examples are T-1 from Mitsubishi Chemical, or ZELEC® ECP-3005-XC and ZELEC® ECP-3010-XC from of DuPont Chemicals.

Alternatively, the liquid coating composition can be homogeneous and can include UV curable polymers and conductive species that are soluble, compatible, or miscible with the UV curable polymers. The homogeneous liquid composition can be spray coated on the inside of the mandrel and can form a UV cured homogeneous ITB coating layer. In embodiments, the ITB coating layer can have uniform electrical resistivities in bulk and/or on the surfaces.

The conductive species used in a homogeneous coating composition can include, but are not limited to, salts of organic sulfonic acid such as sodium sec-alkane sulfonate (ARMOSTAT® 3002 from AKZO Nobel) and sodium C10-C18-alkane sulfonate (HOSTASTAT® HS1FF from Clariant), esters of phosphoric acid such as STEPFAC® 8180, 8181, 8182 (phosphate esters of alkyl polyethoxyethanol), 8170, 8171, 8172, 8173, 8175 (phosphate esters of alkylphenoxy polyethoxyethanol), POLYSTEP® P-11, P-12, P-13 (phosphate esters of tridecyl alcohol ethoxylates), P-31, P-32, P-33, P-34, P-35 (phosphate esters of alkyl phenol ethoxylates), all available from Stepan Corporation, esters of fatty acids such as HOSTASTAT® FE20liq from Clariant (Glycerol fatty acid ester), ammonium or phosphonium salts such as benzalkonium chloride, N-benzyl-2-(2,6-dimethylphenylamino)-N,N-diethyl-2-oxoethanaminium benzoate, cocamidopropyl betaine, hexadecyltrimethylammonium bromide, methyltrioctylammonium chloride, and tricaprylylmethylammonium chloride, behentrimonium chloride (docosyltrimethylammonium chloride), tetradecyl(trihexyl)phosphonium chloride, tetradecyl(trihexyl)phosphonium decanoate, trihexyl(tetradecyl)phosphonium bis 2,4,4-trimethylpentylphosphinate, tetradecyl(trihexyl)phosphonium dicyanamide, triisobutyl(methyl)phosphonium tosylate, tetradecyl(trihexyl)phosphonium bistriflamide, tetradecyl(trihexyl)phosphonium hexafluorophosphate, tetradecyl(trihexyl)phosphonium tetrafluoroborate, ethyl tri(butyl)phosphonium diethylphosphate, etc.

The homogeneous composition can be prepared by mixing the conductive species in a liquid UV curable polymer to form a solution, and then adding photoinitiators into the solution. The final homogeneous ITB coating layer can include conductive species ranging from about 1% to about 40%, or ranging from about 5% to about 30%, or ranging from about 10% to about 20% by weight of the total homogeneous ITB layer.

The volume (or bulk) resistivity and the surface resistivity of the final ITB coating layer can be uniform with minimal variation. For example, a maximum value of volume resistivity can be within the range of 1 to 10 times the minimum value, and a maximum value of surface resistivity can be within the range of 1 to 100 times the minimum value.

The formed ITB can have a surface resistivity ranging from about $10^8$ ohms/sq to about $10^{13}$ ohms/sq, or ranging from about $10^9$ ohms/sq to about $10^{12}$ ohms/sq, or ranging from about $10^{10}$ ohms/sq to about $10^{11}$ ohms/sq. In embodiments, the formed ITB coating can have a mechanical Young's modulus ranging from about 500 MPa to about 10,000 MPa, or ranging from about 1,000 MPa to about 5,000 MPa, or ranging from about 1,500 MPa to about 3,000 MPa. In embodiments, the ITB is seamless and the ITB has a belt width ranging from about 8 inches to about 40 inches and a circumference ranging from about 8 inches to about 60 inches although any width and length is possible depending on the mandrel. In embodiments, the ITB has a total thickness of from about 30 microns to about 500 microns.

In embodiments, the disclosed ITBs and method of their formation can include the materials and methods disclosed in co-pending U.S. patent application Ser. No. 12/624,589, filed Nov. 24, 2009, and entitled "UV Cured Heterogeneous Intermediate Transfer Belts (ITB)," and Ser. No. 12/731,449, filed Mar. 25, 2010, and entitled "Intermediate Transfer Belts," which are hereby incorporated by reference in their entireties.

Specific embodiments will now be described in detail. These examples are intended to be illustrative, and not limited to the materials, conditions, or process parameters set forth in these embodiments. All parts are percentages by solid weight unless otherwise indicated.

EXAMPLES

A carbon nanotube-based dispersion was obtained from Zyvex Performance Materials (Columbus, Ohio). The carbon nanotube-based dispersion contained multi-walled carbon nanotubes (MWNT) mixed with a dispersant in a solvent of methylene chloride. In this carbon nanotube-based dispersion, MWNT/dispersant had a ratio of 83/17 by weight and the dispersion had solids (including the MWNTs and the dispersant) in an amount of about 78% by weight. The dispersant can be represented by;

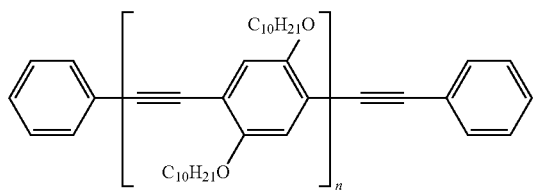

About 100 grams of the above nanotube-based dispersion was mixed with (1) about 111.8 grams of the aromatic urethane acrylate, (2) about 13 grams of the acrylate monomer, and (3) about 4.4 grams of the photoinitiator.

In this mixture, the aromatic urethane acrylate used was commercially available as SARTOMER® CN2901 of urethane triacrylate oligomer (Tg=35° C.) from Sartomer (Exton, Pa.). The acrylate monomer used was commercially available as LAROMER® TMPTA (trimethylolpropane triacrylate) from BASF (Florham Park, N.J.). The photoinitiator used was commercially available as IRGACURE® 651 ($\alpha,\alpha$-dimethoxy-$\alpha$-phenylacetophenone) from Ciba Specialty Chemicals (Tarrytown, N.Y.).

A uniform liquid dispersion was formed by ball milling the above mixture with 2 millimeter stainless shot with an Attritor for 1 hour. The uniform liquid dispersion was then coated on a glass plate using a draw bar coating method, and subsequently cured using a Hanovia UV instrument (Fort Washington, Pa.) for about 40 seconds at a wavelength of about 325 nanometers (125 watts). The film was then released from the glass plate having a thickness of about 100 microns.

The above ITB film of Example 1 was measured for surface resistivity (averaging four to six measurements at varying spots, 72° F./65 percent room humidity) using a High Resistivity Meter (Hiresta-Up MCP-HT450 available from Mitsubishi Chemical Corp.). The surface resistivity was about $2.4 \times 10^9$ ohms/sq, within the functional range of an ITB of from about $10^9$ to about $10^{13}$ ohms/sq.

The above ITB film of Example 1 was measured for Young's modulus following the ASTM D882-97 process. A sample (0.5 inch×12 inch) from Example 1 was placed in the measurement apparatus, the Instron Tensile Tester, and then elongated at a constant pull rate until breaking. The instrument recorded the resulting load versus sample elongation. The modulus was calculated by taking any point tangential to the initial linear portion of this curve and dividing the tensile stress by the corresponding strain. The tensile stress was given by load divided by the average cross sectional area of the test sample.

The Young's modulus of the Example 1 ITB film was measured to be about 2,000 MPa, within the reported modulus range of the thermoplastic ITBs on the market (from about 1,000 to about 3,500 MPa). Examples of these thermoplastic ITBs for comparison are polyester/carbon black ITB (Young's modulus of about 1,200 MPa), polyamide/carbon black ITB (Young's modulus of about 1,100 MPa), and polyimide/polyaniline ITB (Young's modulus of about 3,500 MPa).

Example 2

About 10 grams of STEPFAC® 8180, phosphate esters of alkyl polyethoxyethanol (Stepan Corporation, Northfield, Ill.) was mixed with about 76 grams of SARTOMER® CN2901, urethane triacrylate oligomer (T$_g$=35° C., Sartomer, Exton, Pa.) and about 10 grams of LAROMER® TMPTA, trimethylolpropane triacrylate monomer (BASF, Florham Park, N.J.). About 4 grams of IRGACURE® 651, α,α-dimethoxy-α-phenylacetophenone photoinitiator (Ciba Specialty Chemicals, Tarrytown, N.Y.) was added to the acrylate and conductive species mixture to form a coating solution.

The coating was then coated on a glass plate using a draw bar coating method, and subsequently cured using a Hanovia UV instrument (Fort Washington, Pa.) for about 40 seconds at a wavelength of about 325 nanometers (about 125 watts). The UV cured composite film was then released from the glass plate and had a thickness of about 100 microns. The UV cured composite film was substantially clear with no phase separation.

The ITB member of Example 2 was measured for surface resistivity (averaging four to six measurements at varying spots, 72° F./65% room humidity) using a High Resistivity Meter (Hiresta-Up MCP-HT450 available from Mitsubishi Chemical Corp.). The surface resistivity was about $3.7 \times 10^{10}$ ohm/square, within the functional range of an ITB of from about $10^9$ to about $10^{13}$ ohm/square.

The Young's modulus of the ITB member of Example 2 was measured to be about 1,600 MPa, within the reported modulus range of the thermoplastic ITBs on the market (from about 1,000 to about 3,500 MPa).

Other embodiments of the present teachings will be apparent to those skilled in the art from consideration of the specification and practice of the present teachings disclosed herein. It is intended that the specification and examples be considered as exemplary only, with the true scope and spirit of the present teachings being indicated by the following claims.

What is claimed is:

1. A method of forming a seamless transfer member suitable for use with an image forming system, comprising:
    spray coating a mixture consisting of: a liquid ultra violet (UV) curable polymer; and carbon nanotubes in a dispersant, onto an inner surface of a rotating cylindrical mandrel, wherein the inner surface of the mandrel has a $R_a$ roughness of from about 0.01 microns to about 1.0 microns, wherein the liquid UV curable polymer is selected from the group consisting of: a monomeric acrylate and an oligomeric acrylate, wherein the one or more photoinitiators are selected from the group consisting of: acyl phosphines, α-hydroxyketones, benzyl ketals and α-aminoketones, wherein the one or more photoinitiators are present in an amount of about 0.5 weight percent to about 10 weight percent based on the weight of the liquid UV curable polymer, wherein the carbon nanotubes are present in an amount of from about 3 weight percent to about 20 weight percent based on a total solids weight of the mixture;
    curing the liquid UV polymer with ultra violet energy; and
    removing the cured UV polymer from the cylindrical rotatable mold.

2. The method of claim 1 further comprising:
    spray coating a second liquid UV curable polymer onto the cured UV polymer in the rotating cylindrical mandrel; and
    curing the second liquid UV polymer with ultra violet energy.

3. The method of claim 1, wherein the wherein the monomeric acrylate is selected from the group consisting of trimethylolpropane triacrylate, hexandiol diacrylate, tripropyleneglycol diacrylate, dipropyleneglycol diacrylate, and mixtures thereof.

4. The method of claim 1, wherein the oligomeric acrylate is selected from the group consisting of urethane acrylate, polyester acrylate, epoxy acrylate, polyether acrylate, olefin acrylate, and mixtures thereof.

5. The method of claim 1 wherein the mandrel is rotated at a speed of from about 100 rpm to about 1,500 rpm.

6. The method of claim 1 further comprising:
    treating the inner surface of the cylindrical mandrel with a release agent prior to the spray coating.

7. A method of forming a seamless transfer member suitable for use with an image forming system, comprising:
    spray coating a composition consisting of: a liquid ultra violet (UV) curable polymer; one or more photoinitiators; and conductive particles, onto an inner surface of a rotating cylindrical mandrel, wherein the inner surface of the mandrel has a $R_a$ roughness of from about 0.01 microns to about 1.0 microns, wherein the liquid UV curable polymer is selected from the group consisting of: a monomeric acrylate and an oligomeric acrylate, wherein the photoinitiator is selected from the group consisting of: acyl phosphines, α-hydroxyketones, benzyl ketals and α-aminoketones, wherein the photoinitiator is present in an amount of about 1 weight percent to about 7 weight percent based on the weight of the liquid UV curable polymer, wherein the conductive particles are selected from the group consisting of: carbon black, carbon nanotubes, fullerenes, potassium titanate, graphite, acetylene black and fluorinated carbon black, wherein the conductive particles are present in an amount of from about 3 weight percent to about 20 weight percent based on a total solids weight of the composition;
    curing the composition with ultra violet energy; and
    removing the cured composition from the cylindrical rotatable mold.

8. The method of claim 7, wherein the wherein the monomeric acrylate is selected from the group consisting of trimethylolpropane triacrylate, hexandiol diacrylate, tripropyleneglycol diacrylate, dipropyleneglycol diacrylate, and mixtures thereof.

9. The method of claim 7, wherein the oligomeric acrylate is selected from the group consisting of urethane acrylate, polyester acrylate, epoxy acrylate, polyether acrylate, olefin acrylate, and mixtures thereof.

10. A method of forming a seamless transfer member suitable for use with an image forming system, comprising:
    spray coating a mixture consisting of: a liquid ultra violet (UV) curable polymer; one or more photoinitiators; conductive species miscible with the UV curable polymer; and optionally conductive particles, onto an inner surface of a rotating cylindrical mandrel, wherein the inner surface of the mandrel has a $R_a$ roughness of from about 0.01 microns to about 1.0 microns, wherein the liquid UV curable polymer is selected from the group consisting of: a monomeric acrylate and an oligomeric acrylate, wherein the one or more photoinitiators are selected from the group consisting of: acyl phosphines, α-hydroxyketones, benzyl ketals and α-aminoketones, wherein the one or more photoinitiators are present in an amount of about 0.5 weight percent to about 10 weight percent based on the weight of the liquid UV curable polymer, wherein the conductive species are selected from the group consisting of: salts of organic sulfonic acid, esters of phosphoric acid, ammonium salt, phosphonium salts, wherein the conductive species are present in an amount of from about 1 weight percent to about 40 weight percent based on a total weight of the mixture, wherein the optional conductive particles are selected from the group consisting of: carbon black, carbon nanotubes, fullerenes, potassium titanate, graphite, acetylene black and fluorinated carbon black;

curing the liquid UV polymer with ultra violet energy; and removing the cured UV polymer from the cylindrical rotatable mold.

11. The method of claim 10, wherein the monomeric acrylate is selected from the group consisting of trimethylolpropane triacrylate, hexandiol diacrylate, tripropyleneglycol diacrylate, dipropyleneglycol diacrylate, and mixtures thereof.

12. The method of claim 10, wherein the oligomeric acrylate is selected from the group consisting of: urethane acrylate, polyester acrylate, epoxy acrylate, polyether acrylate, olefin acrylate, and mixtures thereof.

* * * * *